United States Patent
Weber

(10) Patent No.: US 7,157,902 B2
(45) Date of Patent: Jan. 2, 2007

(54) DISPLACEMENT SENSOR WITH INNER AND OUTER WINDING SECTIONS

(75) Inventor: Markus Weber, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 11/018,598

(22) Filed: Dec. 20, 2004

(65) Prior Publication Data

US 2005/0104578 A1    May 19, 2005

Related U.S. Application Data

(63) Continuation of application No. PCT/DE03/001201, filed on Apr. 10, 2003.

(30) Foreign Application Priority Data

Jun. 26, 2002   (DE)  ................................ 102 28 596
Nov. 13, 2002   (DE)  ................................ 102 53 107

(51) Int. Cl.
   *G01B 7/14*   (2006.01)
(52) U.S. Cl. .............................. 324/207.15; 324/207.24
(58) Field of Classification Search ........... 324/207.11, 324/207.15, 207.16, 207.18, 207.17, 207.24
See application file for complete search history.

(56) References Cited

U.S. PATENT DOCUMENTS 3,456,132 A * 7/1969 Dechelotte ................... 327/603
4,623,840 A   11/1986 Fujimura et al.
6,580,264 B1 * 6/2003 Nekado ................. 324/207.16

FOREIGN PATENT DOCUMENTS

| CH | 575 115 A | 4/1976 |
| CH | 575115 A5 * | 4/1976 |
| DE | 41 28 159 A1 | 2/1993 |
| DE | 4128159 A1 * | 2/1993 |

OTHER PUBLICATIONS

Translation of CH 575115 A5.*
Translation of DE 4128159 A1.*

* cited by examiner

*Primary Examiner*—Edward Lefkowitz
*Assistant Examiner*—David M. Schindler
(74) *Attorney, Agent, or Firm*—Alston & Bird LLP

(57) ABSTRACT

A sensor coil for a non-contacting inductive displacement sensor, having two inner substantially identically formed winding sections (1), with an unwound section (2) provided between the two inner winding sections. Also, the coil has two outer substantially identically formed winding sections (3), which are respectively arranged at the ends of the two inner winding sections (1) facing away from the unwound section (2). The two outer winding sections (3) have a larger number of windings than the two inner winding sections (1), thereby producing a measuring signal which is substantially linear along the measuring range.

21 Claims, 2 Drawing Sheets

DISPLACEMENT SENSOR WITH INNER AND OUTER WINDING SECTIONS

CROSS REFERENCE TO RELATED APPLICATION

The present application is a continuation of international application PCT/DE03/001201, filed 10 Apr., 2003, and which designates the U.S. The disclosure of the referenced application is incorporated herein by reference.

BACKGROUND OF THE INVENTION

The present invention relates to a sensor coil, in particular for a non-contacting inductive displacement sensor, of the type composed of two, substantially identically formed winding sections, with an unwound section being provided between the two winding sections.

For the purposes of the present invention, a winding section means that a corresponding number of windings of a coil wire are wound over a defined section of the sensor coil. Concretely, it could be, for example, a winding chamber, which can be slid onto a coil form in the way a module. Within the scope of the present invention, the two winding sections are further developed such that they are surrounded by other components, so that for the sake of simplicity, the two winding sections may be called inner winding sections.

Furthermore, the present invention relates to a displacement sensor that comprises a sensor coil of the described type.

The automation of manufacturing processes often requires displacement sensors or displacement measuring systems for measuring short distances. In this connection, it is intended to determine, for example, the position of a moved system component relative to a stationarily arranged component. A typical dimension for such measuring ranges is 50 mm and smaller. Also, another typical requirement on the part of the industry lies in constructing the displacement sensors as compactly as possible in the case of a predetermined measuring range, since the available mounting space is very limited in many cases. This requirement often cannot be met to an adequate extent by the sensors that are currently offered on the market and normally used for short displacement measurements, such as, for example, differential chokes or differential transformers. In these known systems, the overall length amounts to about 2.5 times the measured displacement.

Very often, use is made of non-contacting inductive displacement sensors which operate on the basis of a measuring coil that is energized with alternating current, and an associated, electrically and/or magnetically conductive test object. The market offers corresponding sensors, to which in turn different methods are applied. In this connection, symmetrical systems have been found advantageous with favorable characteristics such as, for example, a temperature response that is relatively easy to compensate. Disadvantageous in these so-called differential systems is the unfavorable ratio of measuring range to overall length of the sensor, i.e., the overall length of the sensor is normally by a multiple greater than the measuring range.

Frequently, there is a demand on the part of the industry for sensors with dimensions that are as compact as possible, in particular in applications which involve large piece numbers. In addition, for purposes of a cost favorable manufacture and easy handling, systems are desirable which need few connection lines in order to keep wiring as simple as possible. Thus, a solution is desirable which fully uses the advantages of symmetric inductive systems and additionally meets with the following requirements:
  very compact dimensions of the sensing element;
  few connection lines; and
  the possibility of simple and economical manufacture.

DE 41 28 159 A1 discloses a sensor coil in the form of a measuring device for determining in a non-contacting manner the displacement or angle of rotation of a component. This sensor coil comprises two winding sections, whose wire windings are wound in a single layer to extend along the longitudinal axis of the coil from the inside outward with a decreasing spacing, i.e., in an inhomogeneous way. The thus formed wire windings permit obtaining a measuring signal with the measuring device disclosed in DE 41 28 159 A1, which has a linear calibration curve over the entire measuring range. This sensor coil has a quite favorable ratio of overall length to measuring range.

In practice, the conversion of the concept of the measuring device disclosed in DE 41 28 159 A1 is complicated and can be realized only with costly manufacturing methods, since the inhomogeneous winding is realizable only with special, costly coil winding machines and only with extensive programming requirements. Thus, it is not possible to realize in small piece numbers an economic production of sensor coils with different characteristics, for example, different windings.

It is therefore an object of the present invention to provide and further develop a sensor coil of the above described known type, which can be produced by simple and economically producible manufacturing methods, and which yet has the advantageous characteristics of the known sensor coil.

SUMMARY OF THE INVENTION

The above and other objects and advantages are achieved by the provision of a sensor coil which comprises two substantially identical inner winding sections with an unwound section therebetween, two substantially identical outer winding sections which are respectively disposed adjacent the ends of the inner winding sections which face away from the unwound section, and wherein the outer winding sections each have a larger number of windings than do the inner winding sections.

In accordance with the invention, it has been found that one can avoid an inhomogeneous winding of the sensor coil, and thus avoid the use of costly coil winding machines, when the initially provided inner winding sections are formed by a homogeneous or conventional winding, i.e., a winding with a uniform axial spacing between the coils. A comparable characteristic of the electromagnetic field of the sensor coil as disclosed in DE 41 28 159 A1 is achieved by providing two additional, substantially identically formed outer winding sections that have a larger number of windings than the two inner winding sections. As a result, the electromagnetic field of the sensor coil according to the invention is made weaker in the center region because of an unwound section that is provided in this region. In the outer region of the sensor coil according to the invention, the electromagnetic field is made stronger because of the two outer winding sections with the larger number of windings. This permits realizing in an advantageous manner, at least in sections, a substantially linear course of the resultant measuring signal.

Likewise, the two outer winding sections may have a homogeneous winding, so as to permit applying in a very advantageous manner conventional winding techniques, by which the windings are wound in a side-by-side relationship. This permits the use of simple coil winding machines. Also, this makes it possible to produce in a further advantageous manner a larger number of wound layers in the particular winding sections, whereby it is possible to select the impedance of the resulting sensor coil to be relatively high. With that, it becomes again possible to achieve in an especially advantageous manner both a high responsiveness to signals and a high signal transmission response of the sensor coil. This in turn enables the production of high precision displacement sensors with a linearity error smaller than 0.15% and with a very satisfactory reproducibility of the measuring results that can be obtained with them. Lastly, it is also possible to produce the sensor coil of the invention in small piece numbers without investing in costly production methods. In this connection, it is also economically very possible to produce differently configured sensor coils with different characteristics in respectively small and medium piece numbers.

Among other things, the outer winding sections serve to focus or increase the electromagnetic field of the sensor coil according to the invention in its outer end regions. In a preferred form of realization, the length of each outer winding section is made shorter in the direction of a longitudinal axis of the sensor coil than the length of the inner winding sections. This permits realizing an electromagnetic field distribution, which moreover has in the case of a space saving configuration of the outer winding sections in a likewise advantageous manner a favorable measuring characteristic of the sensor coil or a corresponding displacement sensor.

In a concrete form of realization, each winding section has a uniform wire winding. The latter may be a conventional coil winding, which is wound in side-by-side relationship turn for turn and layer for layer. This permits using, as aforesaid, conventional coil winding machines for producing the sensor coil of the invention, which considerably reduces the production cost of the sensor coils.

It is also possible to influence the characteristic of the sensor coil according to the invention by providing respectively between the inner and the outer winding sections an unwound, substantially identically formed section. These two unwound sections may be dimensioned in their length such that they serve to delimit the inner winding section from the outer winding section, and they also permit the separation to be made wider.

Basically, the characteristics of the sensor coil according to the invention can be determined by its characteristic dimensions. Among these are in particular the length of the unwound portion, the length of the inner winding sections, the number of windings of the inner winding sections, the length of the outer winding sections, the number of windings of the outer winding sections, and/or the length of the unwound portions provided between the inner and the outer winding sections. The cross sectional area of the sensor coil as well as a coil core of a defined permeability that is provided, if need arises, are likewise characteristic dimensions of the sensor coil. Thus, a corresponding selection of the characteristic dimensions of the sensor coil makes it possible to realize an optimal adaptation of the sensor to the particular application. Primarily, the ratio of the number of windings of the outer winding sections to the number of windings of the inner winding sections is a quantity, which is variable for laying out a sensor coil for a certain application, while the coil geometry remains otherwise unchanged. Consequently, it is possible to provide in an advantageous manner correspondingly devised sensor coils also in small piece numbers for a great variety of applications.

In a very particularly preferred form of realization, the wire windings of the four winding sections are interconnected. This could be realized, for example, by the use of one and the same wire, which can be correspondingly wound by a coil winding machine in a sequential manner on the coil in the four winding sections. It would be likewise possible to wind the individual winding sections each with its own wire. In this case, the wires of the individual winding sections would have to be interconnected in a further process step. In particular in the latter case, the wire windings of the inner winding sections are interconnected via the unwound section. If an unwound section is provided between each inner and each outer winding section, it will be possible to connect the wire winding of the inner winding sections to the wire winding of the outer winding sections respectively via this unwound section.

The sensor coil of the invention could be operated by a wiring of the wire windings of the wound sections, which corresponds to a half-bridge circuit. The difference from a conventional half-bridge circuit of a sensor coil, as is disclosed, for example, in DE 41 28 159 A1, and in which only one winding section forms respectively one half of the half-bridge circuit, lies in providing respectively one additional outer winding section for each half of the half-bridge circuit. The sensor coil that is operated by a half-bridge circuit could be operated in an advantageous manner by a circuit that is commonly used for a differential choke.

For a concrete realization of the sensor coil it would be possible to wind the four winding sections with one and the same wire continuously, with the two outer wire ends of the thus wound sensor coil being used for an electrical connection. The sensor coil of the invention could comprise a total of three, outward extending electrical connections of the wire windings of the wound sections. Two of the electrical connections are provided for energizing the sensor coil. The third electrical connection is provided for tapping an output signal of the sensor coil. In the case of the wire connection of the two inner windings, this connection could be provided in the intermediate unwound section. The two outer wire ends could likewise be run into the inner unwound section, so that the outward extending electrical connections are arranged as a whole in the unwound section. This permits in an advantageous manner a simple wiring of the sensor coil according to the invention to a corresponding electronic circuit.

Because of the respectively identically formed inner or outer winding sections and a symmetric arrangement of the inner and outer winding sections relative to the unwound section that is provided between the two inner winding sections, it becomes obvious to use a symmetrically constructed coil form, which receives the wound sections. Depending on the particular application, the coil form can be made linear, arcuate, or circular. In particular, the coil form could be made axis symmetrical with respect to its longitudinal axis, for example, cylindrical or hollow-cylindrical, or have a square or polygonal cross sectional area.

It is basically provided to arrange the winding sections in coaxial relationship with a longitudinal axis of the coil form. In the case of a cylindrical coil form, it would be possible to arrange the likewise cylindrical winding sections in coaxial relationship with the cylinder axis of the coil form.

A displacement sensor comprising a sensor coil according to the invention may basically be configured in two different forms of realization. Thus, it would be possible to arrange the test object that cooperates with the sensor coil of the invention for movement inside or outside of the sensor coil, with the test object being associated to a moved system component and the sensor coil to a stationarily arranged system.

In the first case, the sensor coil is made hollow, and a test object is arranged in the interior of the sensor coil for movement along the direction of the longitudinal axis of the sensor coil. In this arrangement, the displacement sensor requires very little space in the radial direction, and the test object is protected by the coil form. In the second case, a test object could be constructed such that it encloses the sensor coil at least in sections, with the test object being adapted for movement along the direction of the longitudinal axis of the sensor coil. In the case of a cylindrical sensor coil, an annular test object is possible, which encloses the sensor coil.

On the one hand, the present sensor coil of the invention could operate by the eddy current principle. To this end, it would be necessary to construct the test object such that it includes an electrically conductive material. This is because, when a high-frequency alternating current flows through the sensor coil, a magnetic AC field will develop on the sensor coil, which induces eddy currents in the electrically conductive material of the test object. The eddy currents that are induced in the test object, cause the AC resistance of the sensor coil to vary as a function of the position of the test object relative to the sensor coil by a corresponding variation of the inductance of the sensor coil, which can be used for generating a measuring signal.

On the other hand, it would be possible to operate the sensor coil of the invention by an inductive measuring method. To this end, the test object contains a magnetic material. When applying the inductive measuring method, the inductance of the sensor coil is accordingly varied as a function of the magnetic properties of the test object and the position of the test object relative to the sensor coil. Likewise possible is a combination of both measuring methods, especially when the test object contains both an electrically conductive material and a magnetic material.

As previously described, it is possible to design a displacement sensor such that it comprises a sensor coil of the invention. A displacement sensor of this type will normally comprise, in addition to the sensor coil, a test object as well as a corresponding electronic activation unit for energizing and for tapping the output signal of the sensor coil.

To summarize the foregoing, the advantages of the sensor coil according to the present invention are listed one more time.

The sensor coil of the invention is especially suitable for small sensor measuring ranges, wherein the ratio of the length of the coil winding to the diameter of the coil winding is normally below ten. The sensor coil fully possesses the advantages of an inductive differential system. Only three connection lines are needed. For displacement sensors with measuring ranges of less than 50 mm, it is possible to obtain a very satisfactory ratio of the measuring range of the displacement sensor to the overall length of the displacement sensor, for example, below 1.5. In the case of sensor coils with larger coil diameters, this will also apply to greater measuring ranges. The unwound section in the center of the sensor coil can be used for contacting the connection wires, thereby permitting an additional saving in space and a symmetrical construction of the displacement sensor.

An economical and cost-favorable production of the displacement sensor is possible, with the latter having very excellent technical data, such as, for example, linearity and temperature response. A flexible use is possible for LVDT applications where the test object is inside the sensor coil, and for potentiometric applications where the test object surrounds the sensor coil. It is possible to use both ferromagnetic and non-ferromagnetic materials of the test object. The displacement sensor can be operated with the circuitry of a differential choke.

The compact size of the sensor coil, a simple winding concept, and a very simple, electrical interface show the economic advantages of the sensor coil and the displacement sensor for applications with small, medium, and large piece numbers.

There exist various possibilities of improving and further developing the teaching of the present invention in an advantageous manner. To this end, one may refer to the following description of a preferred embodiment of the invention with reference to the drawing. In conjunction with the detailed description of the preferred embodiment of the invention with reference to the drawing, also generally preferred improvements and further developments of the teaching are explained.

DETAILED DESCRIPTION OF THE PREFERRED EMBODIMENTS

Figure 1:
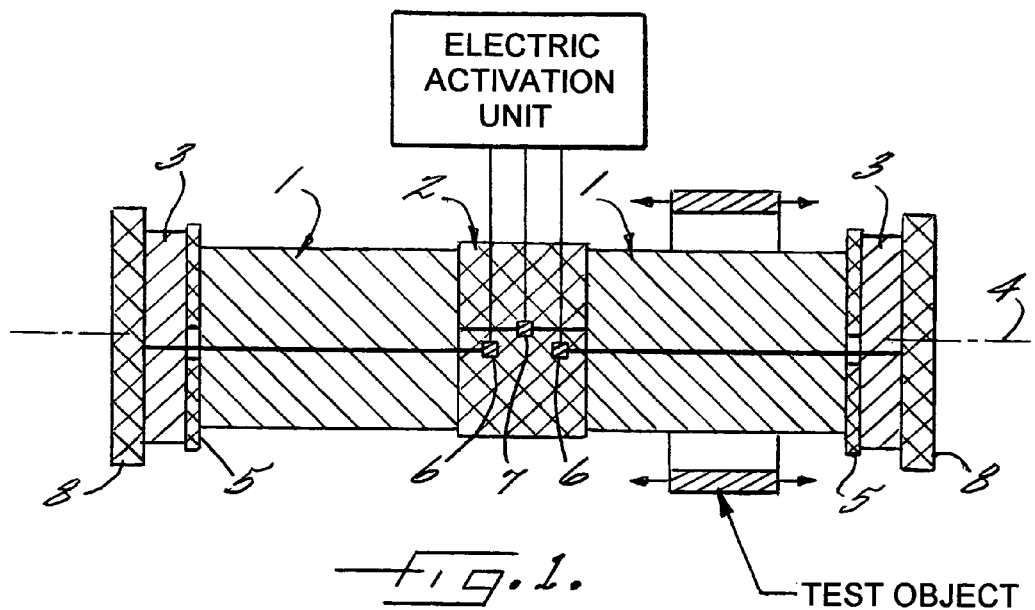
FIG. 1 is a schematic view of an embodiment of a sensor coil according to the invention.

FIG. 1 shows a sensor coil having an annular test object which surrounds the coil, The coil has two inner, substantially identically formed winding sections 1 which are realized in the form of winding chambers. Between the two inner winding sections 1, an unwound section 2 is provided.

In accordance with the invention, two outer, substantially identically formed winding sections 3 are provided, which are respectively arranged at the ends of the two inner winding sections 1 that face away from the unwound section 2. The two outer winding sections 3 have a larger number of windings than the two inner winding sections 1. Thus, the sensor coil of the invention is constructed to be symmetrical, i.e. symmetrical with respect to the unwound section 2.

The length of each outer winding section 3 in the direction of the longitudinal axis 4 of the sensor coil, which is shown in phantom lines, is made shorter than the length of the inner winding sections 1. Since the outer winding sections 3 comprise a larger number of windings than the inner sections 1, the radial extension of the outer winding section 3 as shown in the Figure is greater than that of the inner winding section 1.

Between each inner and each outer winding section 1 and 3, an unwound, substantially identically formed section 5 is provided.

The four winding sections 1, 3 are wound with a single wire. This wire extends from a right hand electric connection 6 to the outer winding section 3 on the right. From there, after a corresponding winding, the wire extends to the right inner winding section 1. After the winding of the right winding section 1, the wire extends via the unwound section 2 to the left inner winding section 1, and then to the left outer winding section 3, and finally to the electric connection 6 on the left.

On the three electric connections 6, 7, the sensor coil can be wired to a half-bridge circuit. To this end, the three, outward extending electric connections 6, 7 of the wire winding of the four winding sections 1, 3 are provided. In this arrangement, the two electric connections 6 serve to energize the sensor coil, and the third electric connection 7 serves to tap an output signal. The three outward extending electric connections 6, 7 are arranged in the unwound section 2.

In the illustrated embodiment a coil form 8 of the sensor coil according to the invention is made symmetrical, namely rotationally symmetrical with respect to its longitudinal axis 4. The coil form 8 extends from the right end to the left end of the sensor coil. For the sake of simplicity, the Figure shows only the end regions of the coil form 8. The winding sections 1, 3 are arranged in coaxial relationship with the longitudinal axis 4 of the coil form 8.

With a predetermined geometry of the coil form, an optimal layout of the sensor is realized by adapting the radio of number of windings of the outer winding sections 3/number of windings of the inner winding sections 1 in connection with selecting a suitable length of the unwound section 2, and in coordination with the existing test object. As a result of the described adaptation, the electromagnetic field in the interior of the coil is bundled over the entire length. With that, practically the entire length of the sensor coil is available as a measuring range.

The main characteristic of the displacement sensor according to the invention with a very favorable ratio of overall length/measuring range is realized by the coil layout. Contrary to the known inductive half bridge (differential choke), the two symmetrically constructed winding sections are subdivided by two relatively short winding sections. With that, a system is formed that comprises four winding sections. A further difference lies in that an unwound section 2 exists between the two inner winding sections 1.

Decisive for laying out the sensor coil for a predetermined sensor geometry is the ratio of the number of windings of the outer winding sections 3 to that of the inner winding sections 1 in connection with dimensioning the length of the unwound section 2 and the test object. In the interior of the sensor, the field is influenced in such a manner that it is weakened by the unwound section 2 in the center of the sensor coil, where a maximum would exist in the normal case. In the two end regions of the sensor coil, however, the field is accordingly focused by the two outer winding sections 3 that have the higher number of windings. This measure makes it possible to realize a homogeneous field distribution in the interior of the sensor. With a corresponding coordination of the described parameters, practically the entire coil length will be available as a linear measuring range. With that, a sensor with a non-linear characteristic will need no additional, costly linearization in terms of circuitry.

Figure 2:
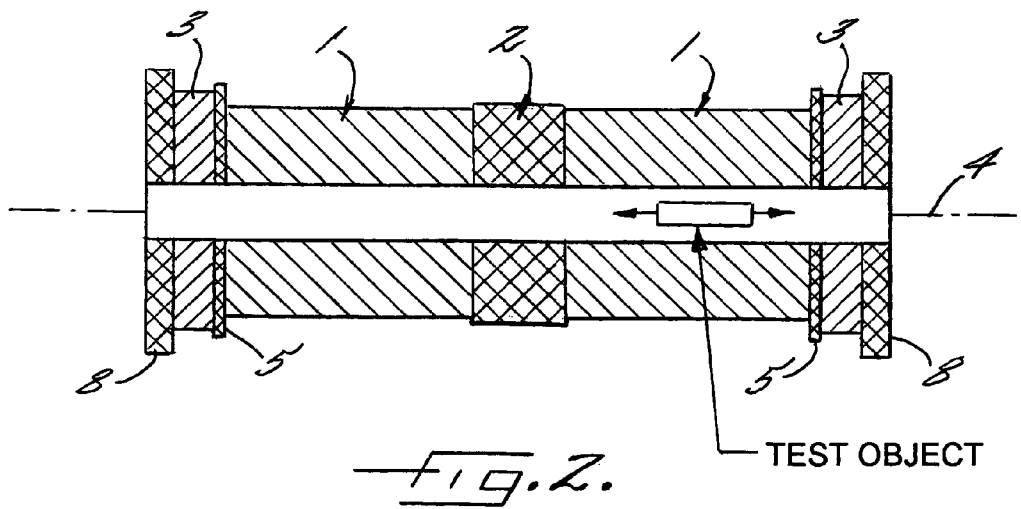
FIG. 2 is a schematic view of a second embodiment of a sensor coil according to the invention.
Figure 3:
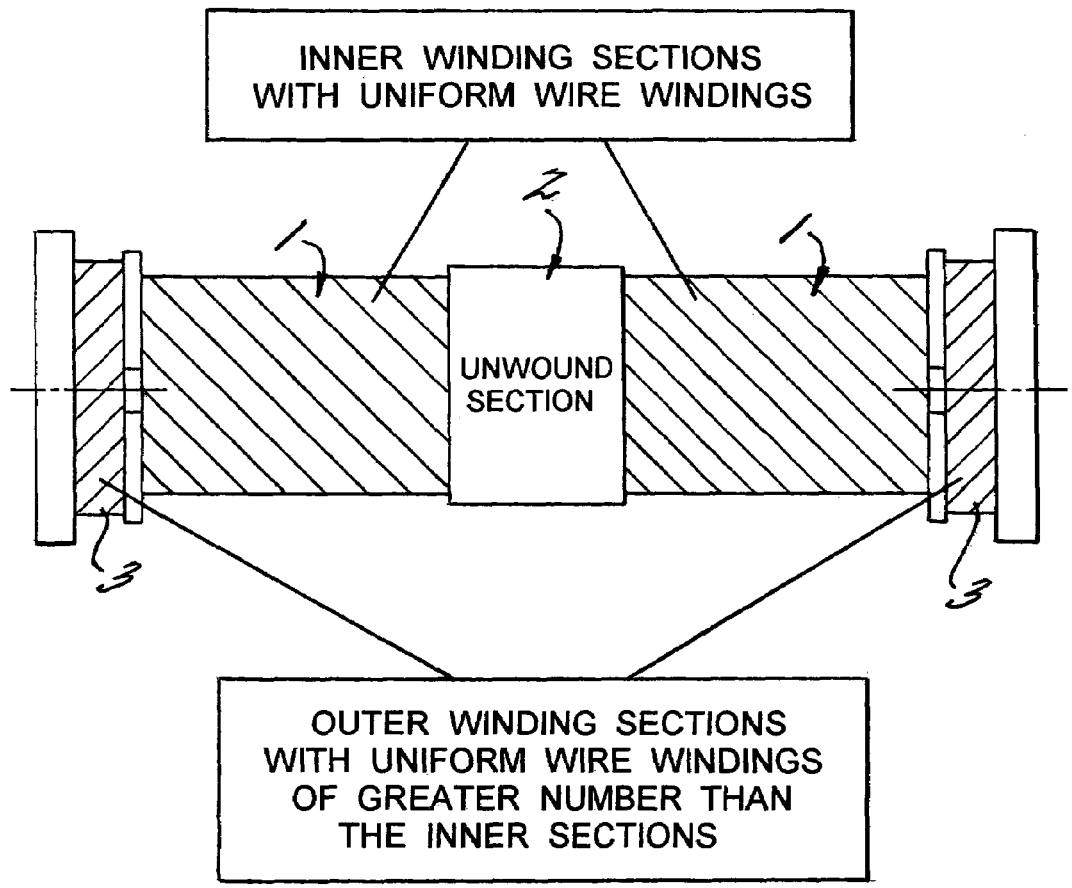
FIG. 3 is a schematic view similar to FIGS. 1 and 2 and illustrating the construction of the inner and outer winding sections and the intermediate unwound section.

FIG. 2 illustrates an embodiment of the sensor coil which is hollow, and wherein a test object is arranged in the interior of the sensor coil for movement along the direction of the longitudinal axis of the coil as indicated by the arrows. The windings of this embodiment correspond to those described above with respect to FIG. 1.

Finally, it should be clearly noted that the above described embodiment has been provided only to describe the claimed teaching, without however limiting its scope to the disclosed embodiment.

The invention claimed is:

1. A sensor coil for use in a non-contacting displacement sensor, comprising
   two substantially identical inner winding sections which are aligned along a longitudinal axis and have an unwound section therebetween,
   two substantially identical outer winding sections which are respectively and coaxially disposed adjacent the ends of the inner winding sections which face away from said unwound section, and
   wherein the outer winding sections each have a larger number of windings than do the inner winding sections, and wherein the lengths of the outer winding sections are made respectively shorter in the direction of the longitudinal axis than the lengths of the inner winding sections.

2. The sensor coil of claim 1, wherein the inner and outer winding sections each comprise a uniform wire winding.

3. The sensor coil of claim 1, wherein a second unwound section is formed between one of the adjacent inner and outer sections, and a third unwound section is formed between the other of the adjacent inner and outer sections, with the second and third unwound sections being substantially identically formed.

4. The sensor coil of claim 1, wherein a measuring characteristic of the sensor coil is influenced by the length of the unwound section, the length of the inner winding sections, the number of windings of the inner winding sections, the length of the outer winding sections, and the number of windings of the outer winding sections.

5. The sensor coil of claim 1, wherein the windings of the four winding sections are wound in series from a single wire.

6. The sensor coil of claim 5, wherein the two inner winding sections each include wire windings which are interconnected to each other across the unwound section.

7. The sensor coil of claim 6, wherein the two inner winding sections and the two outer winding sections are connected in a half-bridge circuit.

8. The sensor coil of claim 5, wherein the single wire of the winding sections includes three outwardly extending electrical connections.

9. The sensor coil of claim 8, wherein two of the electrical connections are provided for energizing the sensor coil, and the third electrical connection is provided for tapping an output signal of the sensor coil.

10. The sensor coil of claim 9, wherein the three outwardly extending electrical connections are arranged at the unwound section.

11. The sensor coil of claim 1, further comprising a symmetrically formed coil form.

12. The sensor coil of claim 11, wherein the coil form is shaped to be symmetrical with respect to the longitudinal axis.

13. The sensor coil of claim 12, wherein the two inner winding sections and the two outer winding sections are arranged in coaxial relationship with the longitudinal axis of the coil form.

14. The sensor coil of claim 1, wherein the sensor coil is hollow, and wherein a test object is arranged in the interior of the sensor coil for movement along the direction of the longitudinal axis of the sensor coil.

15. The sensor coil of claim 14, wherein the test object comprises an electrically conductive material and/or a magnetic material.

16. The sensor coil of claim 1, further comprising a test object which is configured such that it surrounds the sensor coil, with the test object being movable along the direction of the longitudinal axis of the sensor coil.

17. The sensor coil of claim 16, wherein the test object comprises an electrically conductive material and/or a magnetic material.

18. A non-contacting displacement sensor comprising
a sensor coil comprising two substantially identical inner winding sections and having an unwound section therebetween, two substantially identical outer winding sections which are respectively disposed adjacent the ends of the inner winding sections which face away from said unwound section, and with the inner and outer winding sections being aligned to define a longitudinal axis, and wherein the outer winding sections each have a larger number of windings and a shorter longitudinal length than do the inner winding sections,
an electrical activation unit connected to the two inner winding sections and the two outer winding sections for energizing and tapping an output signal of the sensor coil, and
a test object mounted for movement in the direction of the longitudinal axis of the sensor coil.

19. The displacement sensor of claim 18 wherein the inner and outer winding sections each comprise a wire, and wherein the wires of the winding sections are connected in series to each other and to the activation unit.

20. The displacement sensor of claim 19 wherein the windings of the inner and outer winding sections are configured such that a measuring signal having a substantially linear characteristic over a measuring range is produced when the displacement sensor is activated by the activation unit.

21. The displacement sensor of claim 18 wherein the inner and outer winding sections each comprise a wire coil having a substantially uniform axial spacing.

* * * * *